United States Patent [19]
Kehl et al.

[11] Patent Number: 5,324,101
[45] Date of Patent: Jun. 28, 1994

[54] ABS DAMPER CHAMBER AND BLEED VALVE

[75] Inventors: Georg Kehl; Heinz Siegel, both of Stuttgart, Fed. Rep. of Germany

[73] Assignee: Robert Bosch GmbH, Stuttgart, Fed. Rep. of Germany

[21] Appl. No.: 901,065

[22] Filed: Jun. 19, 1992

[30] Foreign Application Priority Data

Jun. 27, 1991 [DE] Fed. Rep. of Germany ....... 4121278

[51] Int. Cl.$^5$ .......................... B60T 8/32; B60T 8/48; B60T 11/30
[52] U.S. Cl. ......................... 303/12; 303/86; 303/113.1; 417/151; 417/198; 261/62; 188/352
[58] Field of Search ..................... 303/10–12, 303/115.4, 80, 84.1, 85, 900, 86; 188/352; 60/453, 584; 220/86.1, 86.2, 89.1; 417/151, 198, 161, 171; 261/62, 53

[56] References Cited

U.S. PATENT DOCUMENTS

| | | | |
|---|---|---|---|
| 1,076,723 | 10/1913 | Turner | 303/73 |
| 3,131,645 | 5/1964 | Dodge | 417/171 |
| 3,998,612 | 12/1976 | Lundy | 261/62 X |

FOREIGN PATENT DOCUMENTS

| | | | |
|---|---|---|---|
| 4013160 | 10/1991 | Fed. Rep. of Germany | |
| 0545776 | 3/1977 | U.S.S.R. | 417/171 |
| 2241295 | 8/1991 | United Kingdom | 303/900 |

Primary Examiner—Robert J. Oberleitner
Assistant Examiner—Josie A. Ballato
Attorney, Agent, or Firm—Edwin E. Greigg; Ronald E. Greigg

[57] ABSTRACT

This invention improves the capability of bleeding a chamber, disposed in the course of a line, that receives pressure fluid. On the pressure side of a high-pressure pump that pumps pressure fluid through a line, a chamber of circular-cylindrical cross section is disposed in its course. Two line segments of the line discharge into the upper face end of the chamber. A guide body disposed coaxially with the longitudinal axis of the chamber is received in the chamber in the region of this face end. The guide body embodied substantially in the form of a circular disk, defines an annular gap toward the inside circumference of the chamber and a subchamber of the chamber toward the face end of the chamber. The guide body directs air located in the chamber into the subchamber, from which it is carried away by the flow of pressure fluid. The hydraulic brake system is especially suitable for motor vehicles.

10 Claims, 2 Drawing Sheets

ABS DAMPER CHAMBER AND BLEED VALVE

BACKGROUND OF THE INVENTION

The invention is based on a hydraulic unit having an anti-lock unit, particularly for motor vehicles.

Such hydraulic systems have voids disposed in the course of lines, such as a damper chamber that follows the pressure side of a high-pressure pump for pumping pressure fluid. This chamber must be free of trapped air, in order to fulfill its function. Moreover, it must be assured that the entire brake system be free of air inclusions. Bleeding of the brake system must therefore be done, the first time it is filled with pressure fluid, and during maintenance and repair work.

To facilitate the bleeding process, it has therefore been proposed (German Patent P 40 13 160.2) that the chamber be disposed with a vertical longitudinal axis in a housing and that the mouths of the connected line segments be provided on the upper, horizontally extending face end. With such an arrangement, air inclusions in the chamber can easily escape through the outgoing line segment during the filling with pressure fluid. However, bleeding becomes more difficult if the chamber is installed in a vehicle with its longitudinal axis departing from the vertical.

OBJECT AND SUMMARY OF THE INVENTION

The brake system according to the invention has an advantage over the prior art that even if the chamber is obliquely positioned, air located under the guide body is directed through the annular gap and, like air in the subchamber, is caught by the intensive flow of pressure fluid at that point and carried through the outgoing line segment.

Further provisions of the invention recited herein create a preferential flow course in the subchamber of the chamber, which promotes the pickup and entrainment of air bubbles to the outgoing line segment.

Furthermore, other features of the invention promote the directing of air to the annular gap.

The shaping of the guide body disclosed enables its production at favorable cost on an automatic lathe and facilitates installation in the housing.

Still other provisions disclosed make for easier manipulation of the guide body in the installation process, because an installation tool can simply engage the tang, position the guide body, and transmit the inward pressing force.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
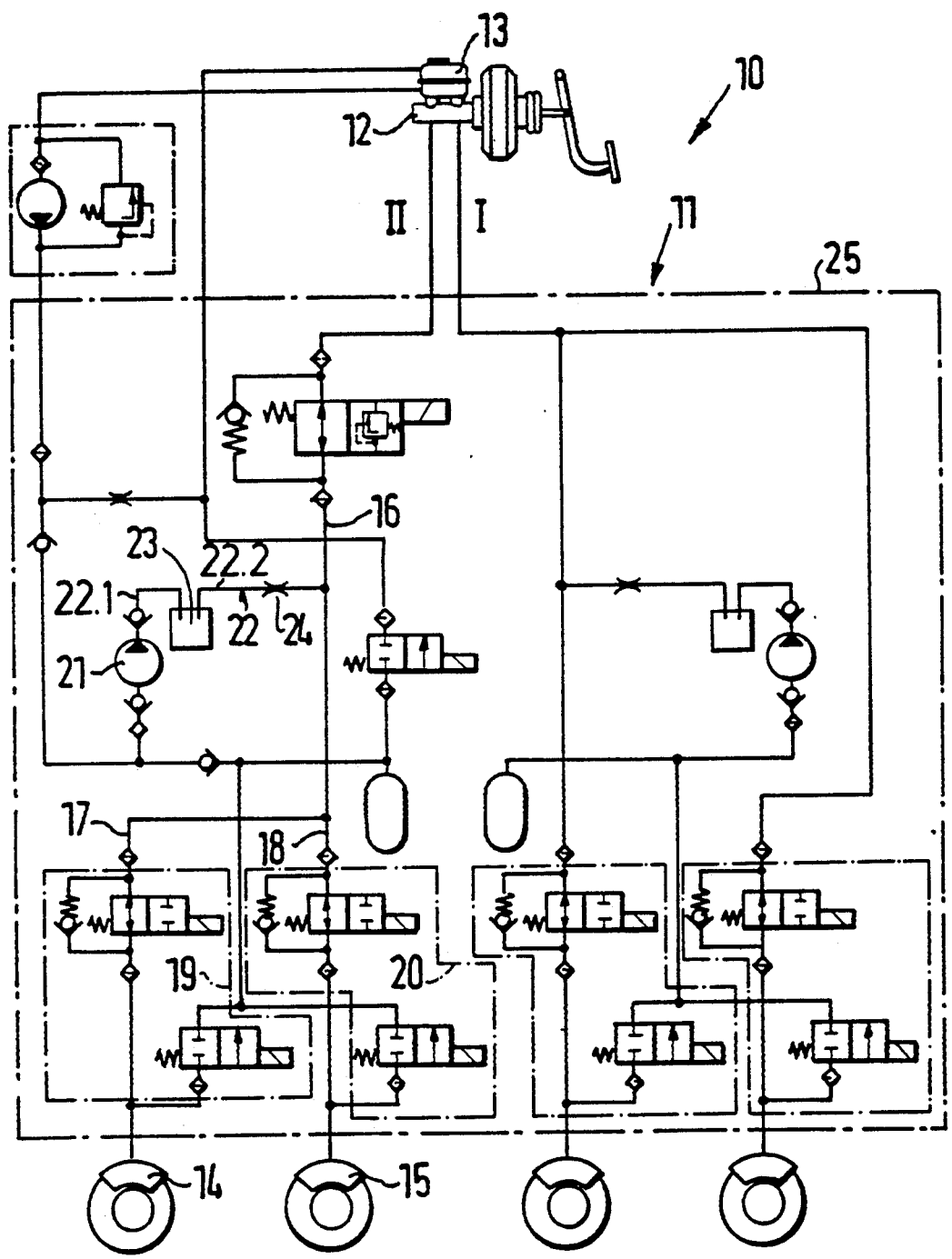
FIG. 1 is a circuit diagram of a hydraulic brake system having a fluid damper chamber, located in a line, following a high-pressure side of a high pressure pump

The circuit diagram shown in FIG. 1 relates to a hydraulic multi-circuit brake system 10 for motor vehicles, having the mechanical elements of an anti-lock unit 11. Brake circuit II, for instance assigned to the rear axle of the vehicle, has brake lines 16, 17, 18 extending between a master brake cylinder 12 with a pressure fluid supply tank 13 and wheel brakes 14, 15. Pressure control valve assemblies 19, 20 for brake pressure modulation are associated with the wheel brakes 14, 15. The brake system 10 has a high-pressure pump 21, with which pressure fluid, drawn for instance from the wheel brakes 14, 15, can be pumped into the brake line 16. To this end, a line 22 is provided on the pressure side of the high-pressure pump 21, in the course of which line a damper chamber 23 and following it in the flow direction a throttle restriction 24 are disposed. These elements of the brake system 10, located between the master brake cylinder 12 and the wheel brakes 14, 15 of brake circuit II (along with other parts, not described, of brake circuits I and II), are combined into a structural unit, called a hydraulic unit 25, represented in FIG. 1 by the large block outlined in dot-dash lines.

Figure 2:
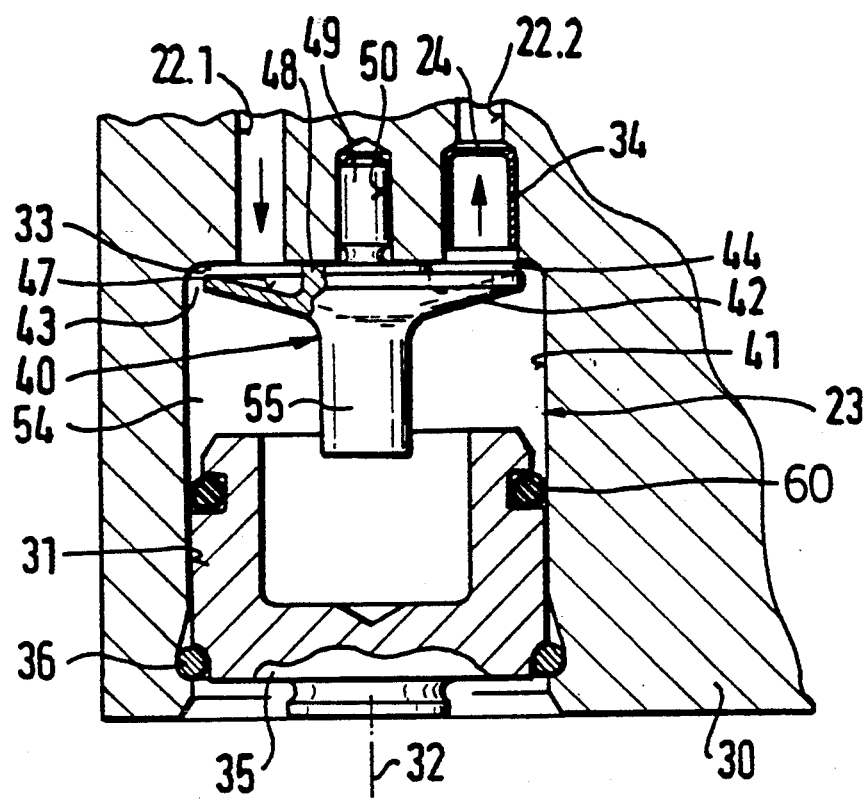
FIG. 2 is a cross section through a housing having the fluid damper chamber and a guide body disposed in it.

The damper chamber has a block-like housing 30, in which the damper chamber 23 is formed (see FIG. 2). To this end, a bore 31 that comes to a flat end is introduced into the housing 30 from below. The chamber 23 therefore has a substantially circular-cylindrical cross section and has a face end 33 extending at right angles to the longitudinal axis 32 of the chamber. The incoming segment 22.1 and the outgoing segment 22.2 of the line 22 discharge into and conduct fluid from the upper chamber face end 33 respectively. An inward-pressing sheath 34 that includes the throttle restriction 24 is received in the outgoing line segment 22.2. In FIG. 1, the throttle restriction 24 has been shown outside the chamber 23 for clarification of the drawings. The chamber 23 is closed off from the outside air by a tightly received cup-shaped plug element 35 with a snap ring 36 as an axial locking means and an O-ring 60 which prevents any leakage from or into the chamber 54.

In the chamber 23, a substantially circular-disk-shaped guide body 40, disposed coaxially with the longitudinal axis 32, is received in the region of the upper face end 33. The rotationally symmetrical guide body 40 has a predominantly radially extending guide shield part 42, which terminates a short distance before the inside circumference 41 of the chamber 23. The guide shield part 42 thus defines an annular gap 43 of slight width radially toward the inner circumference 41 of the chamber 23 and a subchamber 44 of the chamber 23 toward the face end 33 of the chamber.

On the side of the subchamber 44, the guide body 40 has a peripheral channel 47 associated with the mouths of the line segments 22.1 and 22.2 and becoming increasingly deeper with a conical shape toward the longitudinal axis 32 of the chamber. This channel ends in a rounded manner at a collar 48, with which the guide body 40 is supported on the face end 33 of the chamber. Also beginning at the collar 48 is a tang-like extension 49, which is seated with a press fit in a bore 50 of the housing 30 to prevent any axial movement of the guide body 40. The collar 48 located between the mouths of the lines protrudes axially past the guide shield part 42, so that the mean axial length of the subchamber 44, facing the face end 33 of the chamber, is approximately equivalent to the radial width of the annular gap 43.

On the side of its guide shield part 42 toward the interior 54, the guide body 40 is likewise embodied as tapering toward the longitudinal axis 32 of the chamber, with an obtuse cone angle of the taper. On this side, remote from the face end 33 of the chamber, the guide body 40 has a second tang 55, protruding freely into the chamber interior 54, which is intended for installation purposes.

When the chamber 23 is partially filled with pressure fluid the high-pressure pump 21 is set into operation. It pumps pressure fluid through the incoming line segment 22.1 into the subchamber 44 of the chamber 23. Air located in the subchamber 44 is entrained by the pressure fluid and upon overcoming the throttle restriction 24 is pumped through the outgoing line segment 22.2 out of the chamber 23. Air located below the guide shield part 42 in the chamber 23 is directed toward the annular gap 43 and likewise entrained by the flow of pressure fluid. It has been found that the flow of pressure fluid moving substantially inside the peripheral channel 47 between the two line segments 22.1 and 22.2 is also capable of pumping air collecting in a corner region out of the chamber, even if the installed position of the chamber 23 departs from the vertical by an angle of up to approximately 20°. Since it is well known that air rises to the top of a fluid, the hydraulic unit has been described as having an upper face and a lower face. Because the air rises toward the upper face, the inlet 22.1 and outlet 22.2 are connected on the upper end surface of the hydraulic unit. The air gathers in subchamber 44 because the air rises and the subchamber is at the upper end of the hydraulic unit. Since the inlet and outlet are above the chamber 44 and the guide body 40 and the guide body is fixed in place via the extension fixed in the housing by a press fit, there is always a small subchamber so the air entering the subchamber will readily pass on out through the opening 22.2.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A hydraulic brake system (10) with an anti-lock unit (11), having a high-pressure pump (21) that pumps pressure fluid through a line (22) that includes first and second line segments (22.1 and 22.2), a damper chamber (23) of circular-cylindrical cross section is disposed in the line (22), said first line segment (22.1) of the line (22) discharges into the damper chamber (23) in an upper face end (33) thereof and the second line segment 22.2 provides an outlet for fluid flow from the upper face end of the damper chamber (23), a guide body (40) substantially in the form of a circular disk and disposed coaxially with a longitudinal axis (32) of the damper chamber is received in the damper chamber (23) in a region juxtaposed the upper face end (33), and the guide body defines an annular gap (43) between an outer circumference of the guide body (40) and an inner circumference (41) of the damper chamber (23) and further defines a subchamber (44) of the damper chamber (23) toward the face end (33) of the chamber.

2. A hydraulic brake system as defined by claim 1, in which the guide body (40), on the side of the subchamber (44) of the damper chamber, has a peripheral channel (47) associated with the first and second line segments and conically deepening toward the longitudinal axis (32) of the damper chamber, so that a mean axial length of the subchamber (44) of the damper chamber, facing the face end (33) of the damper chamber, is approximately equivalent to a radial dimension of the annular gap (43).

3. A hydraulic brake system as set forth in claim 2 in which said second line segment (22.2) includes a throttle restriction (24).

4. A hydraulic brake system as set forth in claim 1 in which said second line segment (22.2) includes a throttle restriction (24).

5. A hydraulic brake system (10) with an anti-lock unit (11), having a high-pressure pump (21) that pumps pressure fluid through a line (22) that includes first and second line segments (22.1 and 22.2), in the line (22), a damper chamber (23) of circular-cylindrical cross section is disposed, the first line segment (22.1) of the line (22) discharges into the damper chamber (23) in an upper face end (33) thereof, and the second line segment 22.2 provides an outlet for fluid flow from the upper face end of the damper chamber (23), a tapered guide body (40) substantially in the form of a circular disk with an obtuse cone angle toward an interior chamber (54) of the damper chamber 23, said tapered guide body being disposed coaxially with a longitudinal axis (32) of the damper chamber and is received in the damper chamber (23) in a region of the upper face end (33), and the tapered guide body defines an annular gap (43) toward an inner circumference (41) of the damper chamber (23) and further defines a subchamber (44) of the damper chamber (23) toward the face end (33) of the damper chamber.

6. A hydraulic brake system as set forth in claim 5 in which said second line segment (22.2) includes a throttle restriction (24).

7. A hydraulic brake system (10) with an anti-lock unit (11), having a high-pressure pump (21) that pumps pressure fluid through a line (22) that includes first and second line segments (22.1 and 22.2), a damper chamber (23) of circular-cylindrical cross section is disposed in the line (22), the first line segment (22.1) of the line (22) discharges into the damper chamber (23) in an upper face end (33) thereof and the second line segment (22.2) provides an outlet for fluid flow from the upper face end of the damper chamber (23), a guide body (40) substantially in the form of a circular disk and disposed coaxially with a longitudinal axis (32) of the damper chamber is received in the damper chamber (23) in a region of the upper face end (33), and the guide body defines an annular gap (43) toward an inner circumference (42) of the damper chamber (23) and further defines a subchamber (44) of the damper chamber (23) toward the face end (33) of the chamber, said guide body (40) is rotationally symmetrically embodied and toward the subchamber has a collar (48) with an extension (49) that is seated with a press fit in a housing (50) of the damper chamber (23), while the collar is supported between the first and second line segments connected to the face end (33) of the damper chamber (23).

8. A hydraulic brake system as defined by claim 7, in which the guide body (40), on its side remote from the face end (33) of the damper chamber, has a second tang (55) that protrudes freely into the interior (54) of the damper chamber.

9. A hydraulic brake system as set forth in claim 8 in which said second line segment (22.2) includes a throttle restriction (24).

10. A hydraulic brake system as set forth in claim 7 in which said second line segment (22.2) includes a throttle restriction (24).

* * * * *